United States Patent [19]

Pickering

[11] Patent Number: 4,750,774
[45] Date of Patent: Jun. 14, 1988

[54] LIFTING JACK STORAGE COMPARTMENT FOR AUTOMOTIVE VEHICLES

[76] Inventor: Stephen Pickering, 11981 Day Rd., Mishawaka, Ind. 46545

[21] Appl. No.: 945,538

[22] Filed: Dec. 23, 1986

[51] Int. Cl.⁴ ............................................. B62D 33/04
[52] U.S. Cl. ................... 296/37.13; 224/42.42
[58] Field of Search .................. 296/37.1, 37.8, 37.13, 296/37.14; 242/42.42 R, 42.43

[56] References Cited

U.S. PATENT DOCUMENTS

| | | | |
|---|---|---|---|
| 1,455,549 | 5/1923 | Robinson | 296/37.13 |
| 1,502,180 | 7/1924 | Dever, Jr. | 224/42.42 R |
| 1,625,011 | 4/1927 | Wolfe et al. | 224/42.42 R |
| 2,019,674 | 11/1935 | Grebner | 296/37.13 |
| 3,727,971 | 4/1973 | Sisler | 296/37.6 |
| 4,003,596 | 1/1977 | Robertson | 296/37.6 |
| 4,136,904 | 1/1979 | Landerdale | 296/37.1 |
| 4,190,281 | 2/1980 | Chandler | 296/37.6 |

FOREIGN PATENT DOCUMENTS 1387647 12/1964 France .............................. 296/37.13

OTHER PUBLICATIONS

1986 GMC 'Jimmy'.

Primary Examiner—Robert R. Song

[57] ABSTRACT

A storage compartment for securingly holding a vehicle jack and related equipment to vertical support frames of a "van" type vehicle, wherein the compartment is pleasant to look at and, located inside the vehicle while at the same time being easily accessible to a person standing on the ground outside of the vehicle.

31 Claims, 3 Drawing Sheets

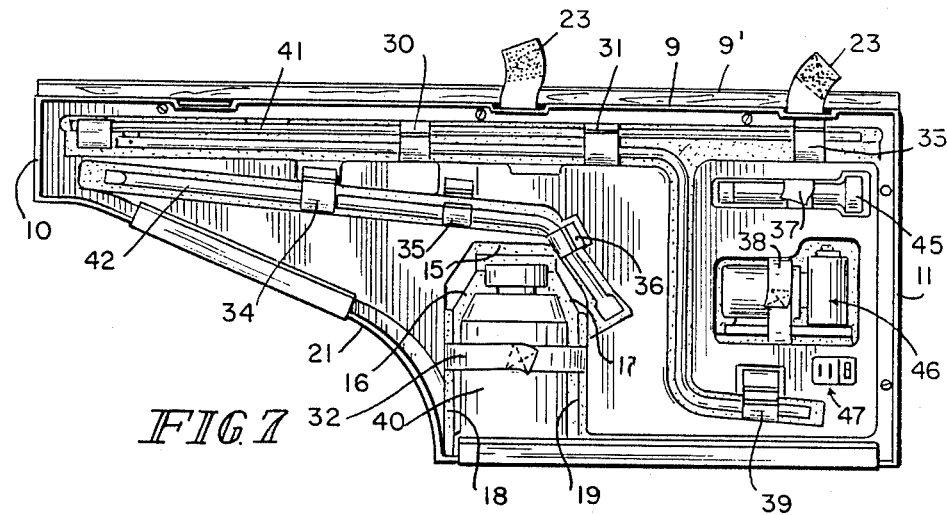
FIG. 7
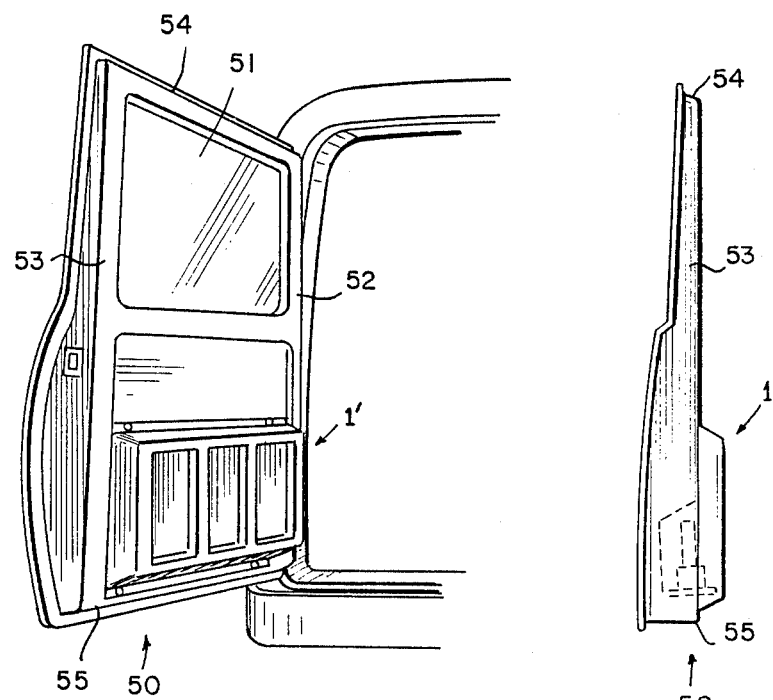
FIG. 3
FIG. 4

LIFTING JACK STORAGE COMPARTMENT FOR AUTOMOTIVE VEHICLES

BACKGROUND AND SUMMARY OF THE INVENTION

This invention relates to storage compartments for storing vehicle jacks and related equipment in motor vehicles.

In vehicles not having trunks, the storage of jacks and related equipment becomes a problem. The jacks and related equipment bounce around, get separated, get stepped on and damaged, roll into passengers and other items in the vehicle, and parts get lost, etc. This is especially true in vehicles such as "vans", motor homes, campers, pick-up trucks, etc.

It is an object of this invention to provide a compartment to house this jack equipment which compartment holds the equipment out of the way, yet easily accessible and in an eye pleasing manner.

It is a further object of this invention to mount a jack equipment storage compartment in a vehicle in a position between complementary exterior wall supporting braces so as to secure the compartment and to utilize what would otherwise be wasted space. Such an installation limits the amount of intrusion the jack compartment makes into the usable space of the vehicle.

In "vans", camper vehicles, recreational vehicles and other vehicles having rear doors, the storage compartment can be mounted above the rear tire well. In this manner, the compartment will be located adjacent the rear of the vehicle so that, upon opening of the rear doors of the vehicle, the compartment can be easily accessed by a person standing on the ground without entry into the vehicle itself. Alternatively, if the vehicle has a side door entrance, the compartment can be located over the rear tire well and extend forwardly to the side door area so as to be easily accessible to one standing on the ground by the side door. In such locations, the jack equipment storage container would have an angled bottom surface portion configured to fit around the tire well and to rest thereon as well as flat bottom portion to rest on the vehicle floor. In that manner, the heaviest portion of the weight of the jack storage compartment is mainly supported by the vehicle floor structure. To that end the heavy portions of the jacking equipment would be located above the flat bottom portion of the storage compartment so as to minimize the weight on the wheel well cover.

Another alternative would be to place the jack equipment storage compartment in the door itself. In "vans", camper vehicles, recreational vehicles and other similar type vehicles, the location could alternatively be in either the rear door or a side door.

It should be noted that "vans", camper vehicles and recreational vehicles are quite often purchased with an unfinished interior which makes for an easy installation of the jack equipment compartment between structural frame members.

It is a further object of the invention to provide a jack equipment compartment which is securely attached to a motor vehicle and easily accessible from the outside.

An additional object of the invention is to provide a jack carrier compartment of minimized area and which securely holds each of the tools by means of clamping means so that the compartment takes up minimum room and so that the tools do not bang together as the vehicle moves along the road. In this manner, noise from the banging together of the tools is eliminated and distortion, bending or damaging of the tools is avoided.

Additionally, the interior of the jack carrier compartment can be configured in different configurations to provide for different types of jacks. Disclosed in FIG. 2 of the drawings is a compartment for a bottle type lifting piston jack which has an enlarged portion for the piston mechanism and a shallow portion for the remaining equipment. Similar types of configurations can be utilized for tri-pod jacks or for bumper jacks. What is desired is to have the compartment as small and narrow as possible so as to take up as little room as possible, while at the same time being easily accessible and providing a separate place for securing each jack element.

In order to improve the appearance of the compartment, a cover is provided to hide the jack elements from view. The cover can be plain or decorated. Additionally, each of the jack elements should be fixedly secured in the compartment by clamps, buckles, belts, hooks or "VELCRO" hook and pile type fasteners to keep the jack parts from banging together. Additionally, to insure that the elements stored in the compartment are firmly secured, the back wall of the compartment can have dished or recessed portions corresponding in configuration to the jack elements and accessories to be held therein.

Aside from essential jack elements, the compartment can be wired to the vehicle electrical system to provide for a source of power to run a light or tire air pump. In the latter situations, the compartment should contain fasteners for securing a light or tire pump in a fixed location in the compartment.

These and other objects, features, and advantages of the present invention will be more apparent from the following description when taken in connection with the accompanyng drawings which show, for purposes of illustration only, plural embodiments in accordance with the present invention, and wherein:

BRIEF DESCRIPTION OF THE DRAWINGS

FIGS. 3-6 shows a compartment location in a door of vehicle.

FIG. 7, shows the compartment wall with a molded-in recess means for holding jack equipment.

DETAILED DESCRIPTION OF THE DRAWINGS

Figure 1:
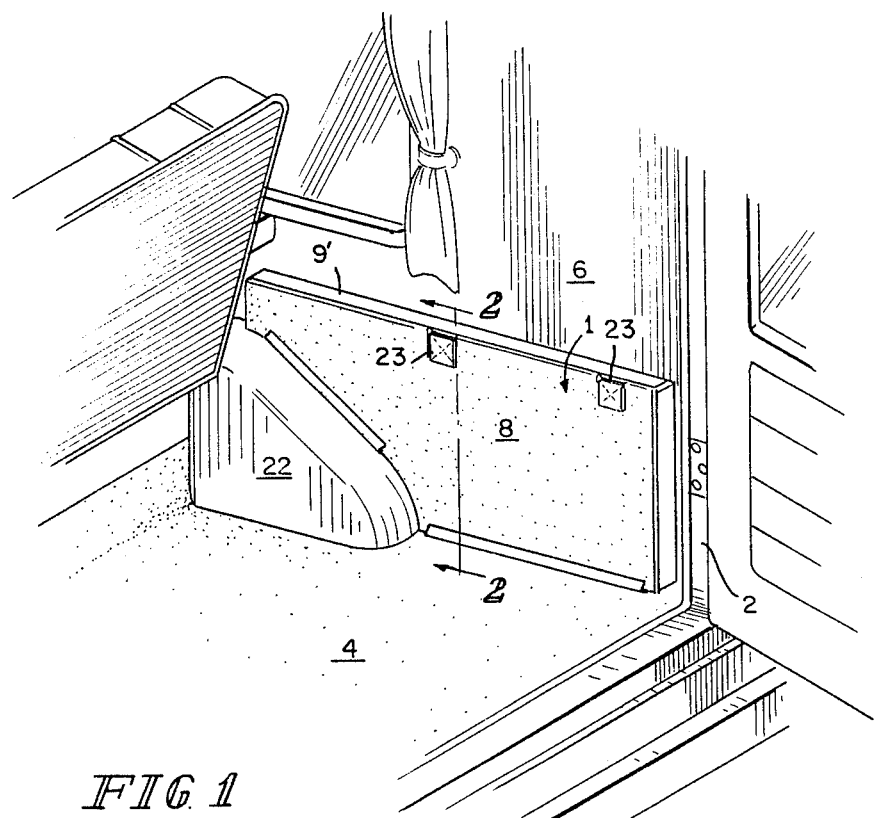
FIG. 1 shows a schematic presentation of a jack compartment in a vehicle, located at the rear passenger side of a vehicle.

Referring now to the drawings wherein like reference numerals are used to designate like parts and more particularly to FIG. 1 wherein a jack tool compartment 1 is generally shown located internally of the vehicle. The compartment 1 is shown as located between two upright vehicle side wall brace members 2 (FIG. 1) and 3 (FIG. 2), respectively, while resting on floor member 4. The upright side wall brace members have the normal cut outs 5 and 5' and support an exterior vehicle panel 7 and an interior decoration panel 6.

Figure 2:
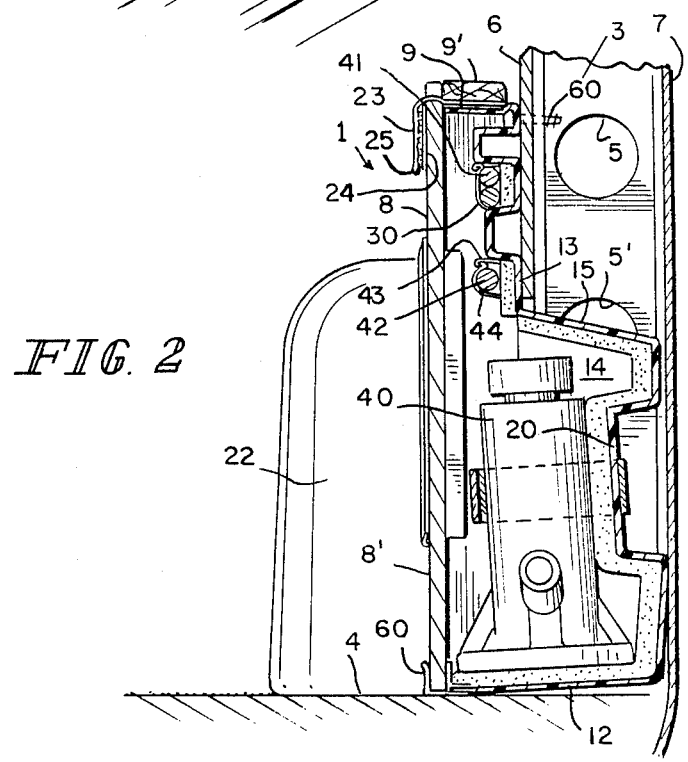
FIG. 2 shows a side view of the compartment taken along the line 2—2 of FIG. 1.

Compartment 1 is shown with side cover 8 in a shut position in FIGS. 1 and 2, while the cover has been removed in FIG. 7. The compartment 1 has a top wall with decorated wood trim 9', two side walls 10 and 11, a bottom wall 12 and a rear wall 13. A recessed area generally indicated at 14 includes a flat top wall 15, two inclined top walls 16 and 17, two side walls 18 and 19 and a back wall 20.

The compartment is dimensioned to fit between the two wall brace members 2 and 3 while resting on and normally secured to the vehicle floor 4 by any type of connector or mastic (not shown). A bottom wall 21 of the compartment is dimensional to fit tightly about a rear tire wheel well 22. The compartment may be freely located, or additionally wedged between, or attached to the side members in any conventional manner such as by screw fasteners 60 or by gluing with a sound deading mastic or equivalent composition (not shown). In installations where one or more of the side supports have been cut away, the compartment can be secured only to the floor and/or to other vehicle structure nearby, such as the interior and exterior vehicle panels 6 and 7. The compartment can be totally recessed between the pannels 6 and 7 (not shown) or can have a portion extend inwardly of the interior wall 6 as shown in FIGS. 1 and 2.

Figure 5:
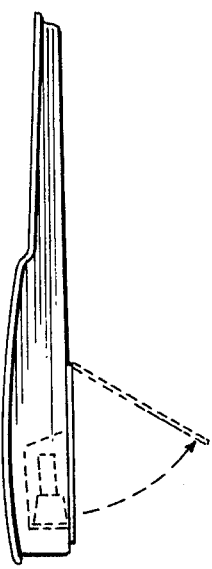
Figure 6:
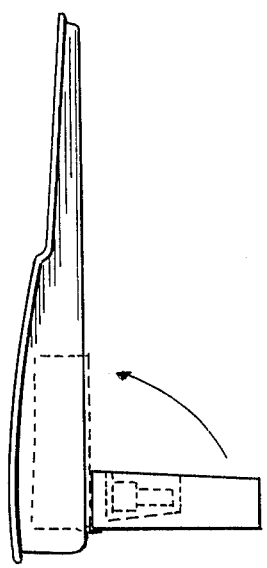

The front cover can be secured to the compartment 1 by means of straps 23 and 24 which are attached to one another by a "VELCRO" fastener at loop 25. The straps 23 are fastened to the top 9 of the compartment 1. Straps 24 are fastened to the compartment side cover 8. The straps 24 act to hold the side cover in position. Alternativly, the straps 24 can be also attached to the side cover to extend for its full height (not shown) to act as a bottom hinge attachment of the side cover 8 to the compartment bottom 12. Here, the straps can be located above or below the bottom 12. If located above bottom 12, a stop to limit inward movement of the side cover would be desirable. Alternative to the "VELCRO" fasteners, magnetic catches or normal kitchen cabinet type hooks or other clamps (not shown) can be used. Any type of hinge mechanism can be used to attach the cover to the compartment. Even where straps are used, they can be localized to the hinge edge which can be at the top or bottom such as shown in FIGS. 5 and 6. Instead of hinging the side cover to the compartment, it can have its bottom edge rest in a u-shaped track 60 (see FIG. 2) attached to, or molded with, the compartment bottom. In such a modification the side cover would be removeable by lifting the cover upwardly from the U-shaped track. If magnetic hooks or kitchen cabinet hooks are utilized, a u-shaped track is not necessary and opening of the cover inward of the vehicle without lifting is possible. Where the cover is removeable, it can be used as a knee pad adjacent the vehicle wheel for protecting the users knees when jacking of the vehicle. Under such conditions, the inwardly facing side 8' of the cover would be placed face up on the ground to act as a cushion and so as not to soil the facing 8' upon re-assembly of the cover.

Inside of the compartment are clamps 30-39 to hold various pieces of jack and related equipment inside the compartment. FIGS. 2 and 7 show a bottle type jack piston mechanism 40, folded jack-handle 41 and lug wrench 42. The clamps 30-39 can be of any conventional type, such as a clamp having a top hinged portion 43 which grasps an upright member 44 (see FIG. 2) or an alternative could be a flexible "VELCRO" strap similar to the connector between the side cover 8 and top 9 of the compartment 1. The two portions of the pivoted jack handle 41 can be placed vertically one above the other as shown in FIG. 2 or side by side.

In addition to the jack equiment, the compartment can be equipped to hold a trouble light 45 and tire air-pump 46. This light and air-pump can have cords which are connectable to an electrical outlet 47 which is connected to the vehicle electrical system.

While FIG. 2 shows the jack compartment 1 housing a bottle type vehicle jack, it would be configured to house a normal bumper jack or tri-pod type vehicle jack.

Figure 8:
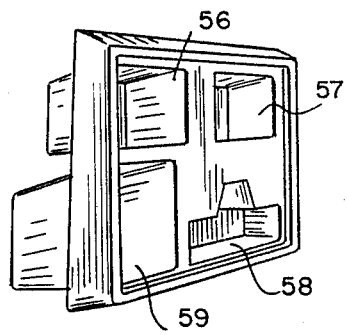
FIG. 8 shows a compartment with molded-in recess means for holding a different type of vehicle jack.

FIGS. 2 and 8 show the compartment with back wall areas 20 and 13 that have molded-in recessed configured to hold each of the jack element and accessories in position. With such molded back portions, the recess would each have a different configuration, corresponding in outline to the equipment to be secured thereat. FIG. 8 shows a portion of the back wall with such molded recesses 56-68. In this regard, note the difference in back wall configuration of FIG. 8 and FIG. 7. Alternatively, the back wall could be flat with only hooks or supports provided.

FIG. 3 shows an alternative location for a jack compartment 1' in the rear door 50 of a "van" type vehicle. The door 50 is shown as having a window 51, side frames 52 and 53, top frame 54 and bottom frame 55. In such a location, the compartment 1' can secured to the side frames 52 and 53 and has a rectangular outer configuration. Internally, this jack compartment 1' has mounting brackets (not shown in detail) for supporting the jack and related equipment similar to that shown in detail in the FIG. 1 embodiment. Rather than utilize a rear door, the compartment can be place in a side door of van vehicle having side doors.

It thus can be seen that applicant has provided a jack and related equipment storage compartment which is attached between vertical side frames of a "van" type vehicle which securely supports various jack and related equipment therein. Such a compartment opens inwardly of the vehicle and is easily accessible to a person standing on the ground adjacent the rear or side door of the vehicle. The compartment provides for a secure location for the jack and related equipment while providing a pleasant outward appearance to the inside of the vehicle.

While I have shown and described plural embodiments in accordance with the present invention, it is understood that the same is not limited thereto but is susceptible to numerous changes and modifications as known to one having ordinary skill in the art, and I therefor do not wish to be limited to the details shown and described herein, but

What is claimed is:

1. A storage equipment compartment located interiorly of a "van" type vehicle comprising: compartment side walls attachable between vertical supporting frames of the "van" type vehicle; a compartment back wall; a compartment top wall; a compartment bottom wall; a cover means for said compartment located to face interiorly of the vehicle and fastenable to at least one of the said side or top walls of the compartment; and wherein said vertical supporting frames of the vehicle are located adjacent a door opening of the vehicle; and wherein said compartment is insertable between the vertical supporting frames to be easily accessible to a person standing outside the vehicle through the door opening.

2. The storage equipment compartment of claim 1, wherein plural clamping means are located in the compartment for securely holding equipment in said compartment.

3. The storage equipment compartment of claim 1, where the compartment holds vehicle jack and related equipment.

4. The storage equipment compartment of claim 2, wherein additional clamping means are provided to hold at least one of a electric light or air pump means securely in said compartment means.

5. The storage equipment compartment of claim 3, wherein additional clamping means are provided to hold at least one of a electric light or air pump means securely in said compartment means.

6. The storage equipment compartment of claim 2, wherein the clamping means are strap means with hook and pile type fasteners.

7. The storage equipment compartment of claim 3, wherein the clamping means are strap means with hook and pile type fasteners.

8. The storage equipment compartment of claim 4, wherein the clamping means are strap means with hook and pile type fasteners.

9. The storage equipment compartment of claim 1, wherein a recess area means is provided inside the compartment which recess area means extends away from the door opening and provides for an enlarged storage area for an enlarged piece of jack equipment.

10. The storage equipment compartment of claim 2, wherein a recess area means is provided inside the compartment which recess area means extends away from the door opening and provides for an enlarged storage area for an enlarged piece of jack equipment.

11. The storage equipment compartment of claim 3, wherein a recess area means is provided inside the compartment which recess area means extends away from the door opening and provides for an enlarged storage area for en enlarged piece of jack equipment.

12. The storage equipment compartment of claim 4, wherein a recess area means is provided inside the compartment which recess area means extends away from the door opening and provides for an enlarged storage area for an enlarged piece of jack equipment.

13. The storage equipment compartment of claim 5, wherein a recess area means is provided inside the compartment which recess area means extends away from the door opening and provide for an enlarged storage area for an enlarged piece of jack equipment.

14. The storage equipment compartment of claim 6, wherein a recess area means is provided inside the compartment which recess area means extends away from the door opening and provides for an enlarged storage area for an enlarged piece of jack equipment.

15. The storage equipment compartment of claim 8, wherein a recess area means is provided inside the compartment which recess area means extends away from the door opening and provides for an enlarged storage area for an enlarged piece of jack equipment.

16. The storage equipment compartment of claim 1, wherein an electrical outlet means is provided internally of the compartment and electrtically attachable to a battery of the "van" type vehicle.

17. The storage equipment compartment of claim 2, wherein an electrical outlet means is provided internally of the compartment and elecrically attachable to a battery of the "van" type vehicle.

18. The storage equipment compartment of claim 3, wherein an electrical outlet means is provided internally of the compartment and electrically attachable to a battery of the "van" type vehicle.

19. The storage equipment compartment of claim 4, wherein an electrical outlet means is provided internally of the compartment and electrically attachable to a battery of the "van" type vehicle.

20. The storage equipment compartment of claim 5, wherein an electrical outlet means is provided internally of the compartment and electrically attachable to a battery of the "van" type vehicle.

21. The storage equipment compartment of claim 6, wherein an electrical outlet means is provided internally of the compartment and electrically attachable to a battery of the "van" type vehicle.

22. The storage compartment of claim 1, wherein the compartment has a rear wall with at least one molded-in recess means therein for assisting in the holding of equipment.

23. The storage compartment of claim 2, wherein the compartment has a rear wall with at least one molded-in recess means therein for assisting in the holding of equipment.

24. The storage compartment of claim 3, wherein the compartment has a rear wall with at least one molded-in recess means therein for assisting in the holding of jack equipment.

25. The storage compartment of claim 9, wherein the compartment has a rear wall with at least one molded-in recess means therein for assisting in the holding of jack equipment.

26. The storage compartment of claim 16, wherein the compartment has a rear wall with at least one molded-in recess means therein for assisting in the holding of jack equipment.

27. The storage compartment of claim 17, wherein the at least one molded-in recess means is configured to have a recess shape corresponding in shape to a shape of the jack equipment to be secured therein.

28. The storage compartment of claim 18, wherein the at least one molded-in recess means is configured to have a recess shape corresponding in shape to a shape of the jack equipment to be secured therein.

29. The storage compartment of claim 19, wherein the at least one molded-in recess means is configured to have a recess shape corresponding in shape to a shape of the jack equipment to be secured therein.

30. The storage compartment of claim 20, wherein the at least one molded-in recess means is configured to have a recess shape corresponding in shape to a shape of the jack equipment to be secured therein.

31. The storage compartment of claim 21, wherein the at least one molded-in recess means is configured to have a recess shape corresponding in shape to a shape of the jack equipment to be secured therein.

* * * * *